No. 749,895. PATENTED JAN. 19, 1904.
N. L. BIRCHFIELD.
VEHICLE BRAKE.
APPLICATION FILED OCT. 9, 1902.
NO MODEL. 2 SHEETS—SHEET 2.
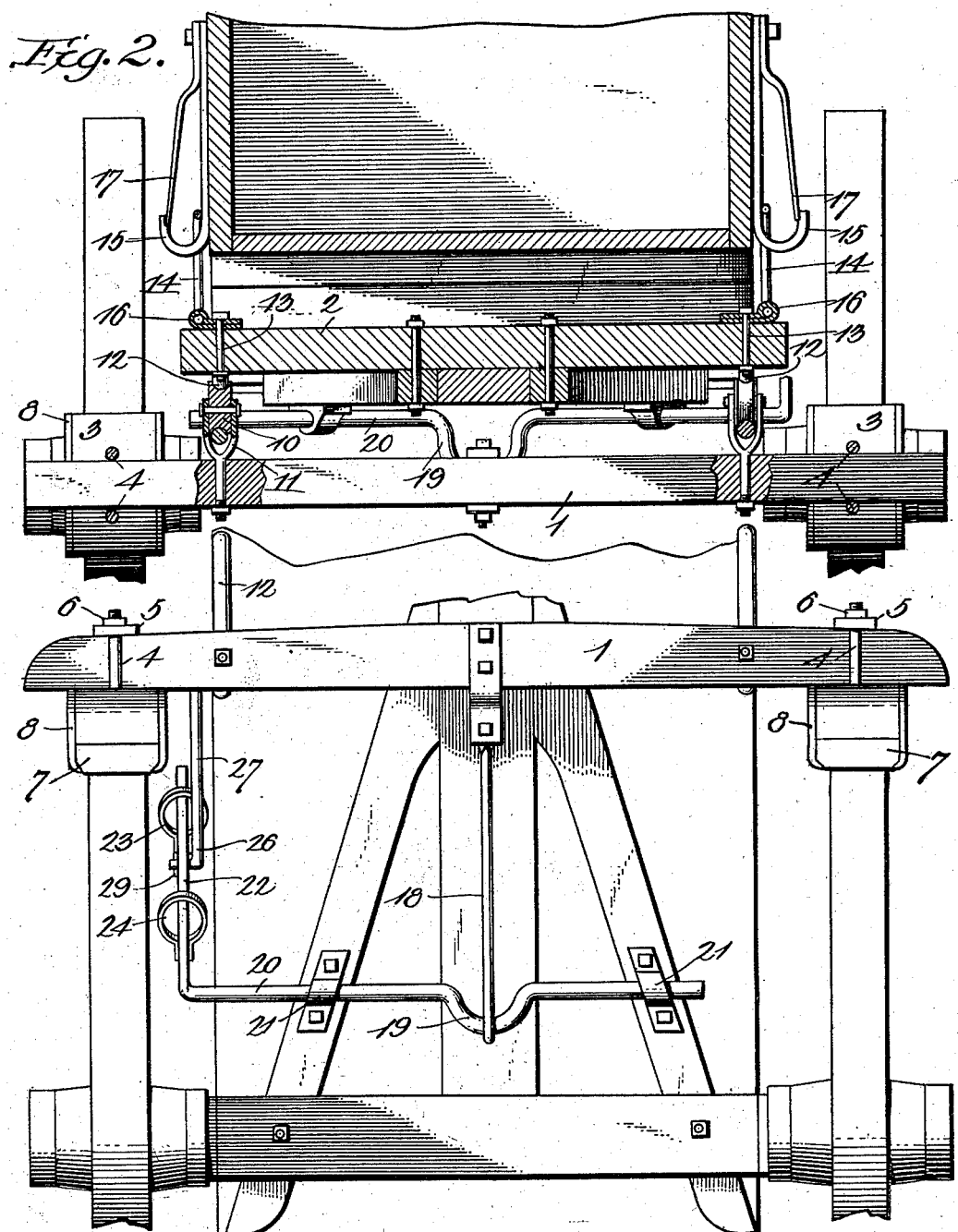

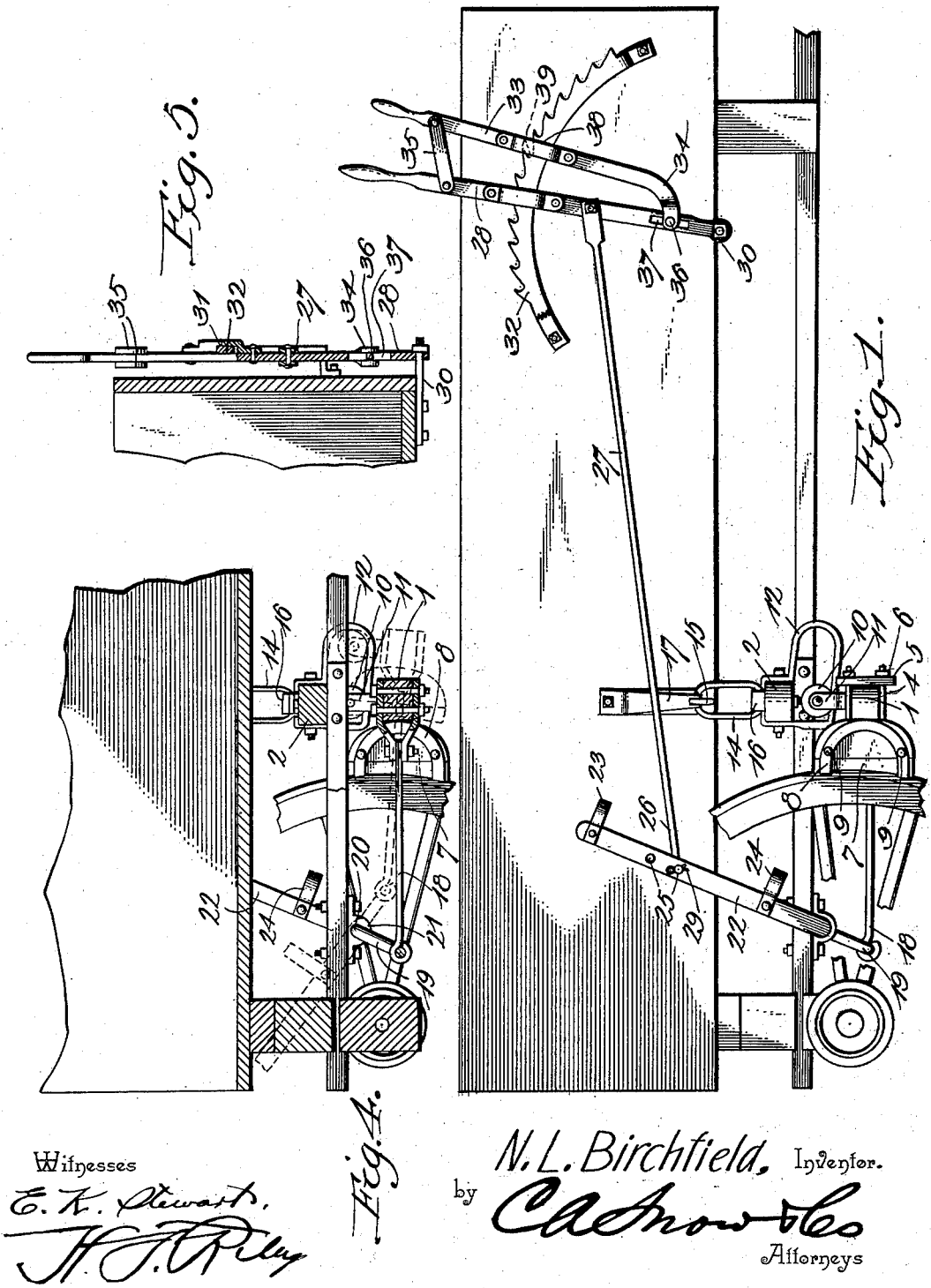

No. 749,895. Patented January 19, 1904.

UNITED STATES PATENT OFFICE.

NATHAN L. BIRCHFIELD, OF BOWDEN, ALABAMA.

VEHICLE-BRAKE.

SPECIFICATION forming part of Letters Patent No. 749,895, dated January 19, 1904.

Application filed October 9, 1902. Serial No. 126,578. (No model.)

*To all whom it may concern:*

Be it known that I, NATHAN L. BIRCHFIELD, a citizen of the United States, residing at Bowden, in the county of Clay and State of Alabama, have invented a new and useful Vehicle-Brake, of which the following is a specification.

The invention relates to improvements in vehicle-brakes.

The object of the present invention is to improve the construction of vehicle-brakes and to provide a simple, inexpensive, and efficient one which will be adapted to be readily applied to a vehicle and in which there will be no lost motion.

A further object of the invention is to provide a vehicle-brake of this character which will enable the body of a wagon to be readily removed when desired and in which the brake-shoes will be capable of ready adjustment to adapt them to engage a wheel properly.

The invention also has for its object to provide an adjustable brake-shoe adapted to have its engaging surface readily renewed when worn.

The invention consists in the construction and novel combination and arrangement of parts hereinafter fully described, illustrated in the accompanying drawings, and pointed out in the claim hereto appended.

In the drawings, Figure 1 is a side elevation of a portion of a vehicle provided with a brake constructed in accordance with this invention. Fig. 2 is a transverse sectional view. Fig. 3 is a reverse plan view of a portion of the vehicle. Fig. 4 is a longitudinal sectional view of the same. Fig. 5 is a detail vertical sectional view illustrating the manner of mounting the operating-lever.

Like numerals of reference designate corresponding parts in all the figures of the drawings.

1 designates a brake-beam, suspended by the means hereinafter described from a transverse bar or beam 2, which is secured to the rear hounds of a running-gear, as clearly shown in Fig. 2 of the drawings. The brake-beam carries brake-shoes 3, secured adjustably to the ends of the beam by clips and adapted to be moved inward and outward thereon to adjust them to suit the dish of a wheel. The clips consist of a pair of bolts 4, having their heads countersunk in the brake-blocks and extending therefrom in advance of the brake-beam and located above the same. The threaded portions of the bolts receive vertical clip-plates 5, which are held in engagement with the brake-beam by nuts 6. The body of the brake-block engages the rear face of the brake-beam, and the clip-plate is arranged in advance of the beam, which is firmly clamped between the said parts.

Each brake-shoe is provided with a detachable section or half-sole 7, which when worn is adapted to be removed and renewed and which is held in place by a pair of approximately U-shaped clamping devices 8, located at opposite sides of the brake-shoe and having their terminals arranged at the side edges of the removable section or half-sole. The clamping devices are connected by bolts 9, and their terminals are extended inward slightly and engage the side portions of the removable sections or half-soles, which are beveled, as clearly shown in Fig. 3.

The brake-beam is provided at opposite sides with grooved rollers 10, mounted in brackets 11 and arranged to run on inclined guides formed by frames 12. The brackets, which are bifurcated or forked at their upper portions to receive the grooved rollers, have threaded stems, which are secured to the brake-beam by means of nuts arranged at the lower faces of the same. The guide-frames 12, which receive the grooved rollers, are constructed of a single piece of rod metal or other suitable material bent into the form of an approximately oblong loop and having its terminals extended upward and secured by a bolt 13 to the opposite edges of the transverse bar or beam 2; but they may be fastened to the same in any other desired manner. The lower portions of the guide-frames extend downward and outward and are adapted to carry the brake-shoes automatically off the hind wheels when the brake is released. The brake-beam is supported by the brackets and the guide-frames, which depend from the transverse bar or beam 2.

The transverse bar or beam 2 is provided at its ends with hinged loops or hangers 14, extending upward and detachably engaging snap-hooks 15. The loops or hangers 14 are arranged in eyes 16 of metal plates or straps, which are doubled on themselves and which are secured to the transverse bar or beam 2 by bolts or other suitable fastening devices. The snap-hooks consist of vertical plates provided at their lower ends with hooks, the bills of which are engaged by springs 17, secured at their upper ends to the plates and having their lower ends bearing against the inner faces of the bills and transversely curved to conform to the configuration of the same. The springs close the mouths of the hooks and prevent the hangers or loops from becoming accidentally disengaged therefrom, and they are adapted to be readily pressed inward to permit the loops or hangers to be detached when it is desired to remove the body of the vehicle.

The brake-beam is centrally connected by a rod 18 with a crank-bend 19 of a transverse rock-shaft 20, journaled in suitable bearings 21 of the rear hounds and provided at one end with an upwardly-extending arm 22. The arm 22 is provided with upper and lower loops or rings 23 and 24, and it has perforations 25. The loops or rings are adapted to receive a pole or lever for enabling the brake to be operated from the top of a load when the wagon-body is removed. The perforations are adapted to receive the rear end 26 of a connecting-rod 27, which extends forward to an operating-lever 28 and which has its front end bifurcated to receive the same. The rear end 26 of the connecting-rod is bent outward at an angle to form a pivot and is perforated for the reception of a key 29, which detachably secures the connecting-rod to the arm of the rock-shaft. The perforations, which may be of any desired number, permit the connecting-rod to be adjusted to vary the leverage of the brake mechanism.

The operating-lever 28, which is fulcrumed at its lower end on an arm or plate 30, is provided between its ends with an opening 31, formed by a metal strap and receiving a curved ratchet 32. The ratchet 32 is secured to the wagon-body at one side thereof, and it is engaged by a supplemental cam-lever 33, slidably connected at its lower end 34 with the lower portion of the operating-lever and connected at its upper portion with the said operating-lever by a pair of links 35, which when the supplemental or auxiliary hand-lever is moved inward cause the same to swing upward out of engagement with the ratchet. The lower end 34 of the supplemental lever is bent at an angle and is secured to the operating-lever by a fastening device 36, which is arranged in a slot 37 of the said operating-lever. The links are located at opposite sides of the levers, which are provided at their upper ends with suitable grips or handles, and the auxiliary lever is provided with an opening 38 to receive the ratchet, and it has a tooth 39 for engaging the same. The tooth 39 is located within the opening of the auxiliary lever, and when the latter is released by the operator it drops by gravity into engagement with the ratchet for locking the brake. The handles or grips of the levers are arranged adjacent to each other and are adapted to be simultaneously grasped to enable the brake to be readily operated. The arm or plate 30 is secured to the lower face of the bottom of the wagon-body, and it projects laterally therefrom, its outer end being shaped into a pivot which is threaded to receive a nut.

It will be seen that the brake is simple and comparatively inexpensive in construction, that it possesses great strength and durability, and that it is adapted to be readily applied to a vehicle.

What I claim is—

The combination with a vehicle-brake and its wheels, of a running-gear, a transverse bar sustained by the running-gear, loops depending from said bar and having the lower side of each loop inclined uniformly downwardly and forwardly from the wheel and forming ways, a brake-beam having rollers arranged on the ways and adapted when the brake-beam is released to travel by gravity down the inclined ways to automatically move the brake-beam out of operative position.

In testimony that I claim the foregoing as my own I have hereto affixed my signature in the presence of two witnesses.

NATHAN L. BIRCHFIELD.

Witnesses:
  WILL SMITH,
  WILLIE STEED.